May 22, 1928.  1,670,996
J. J. THACKER ET AL
LOAF CHEESE KNIFE
Filed April 22, 1927    2 Sheets-Sheet 1
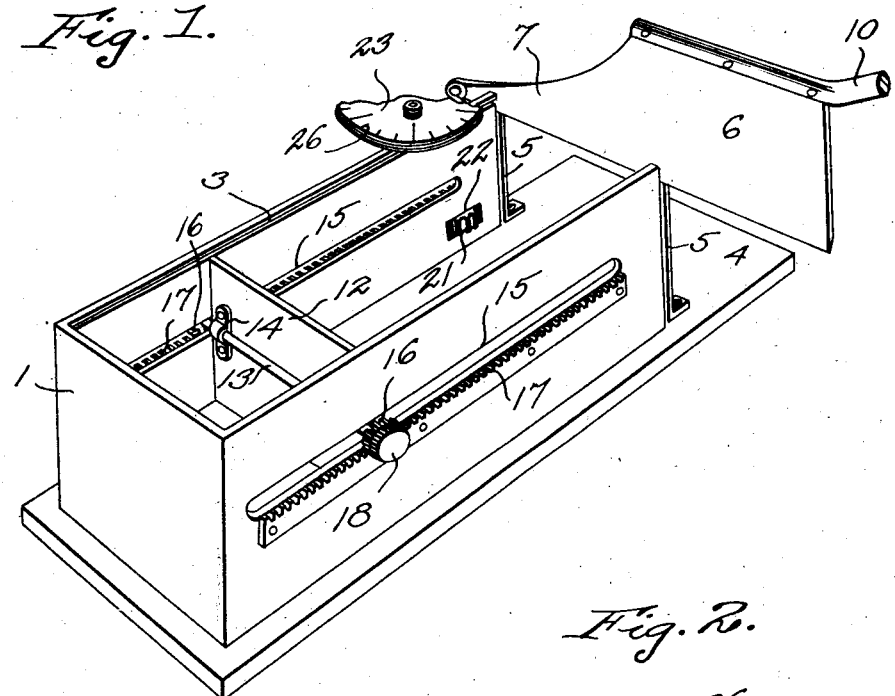
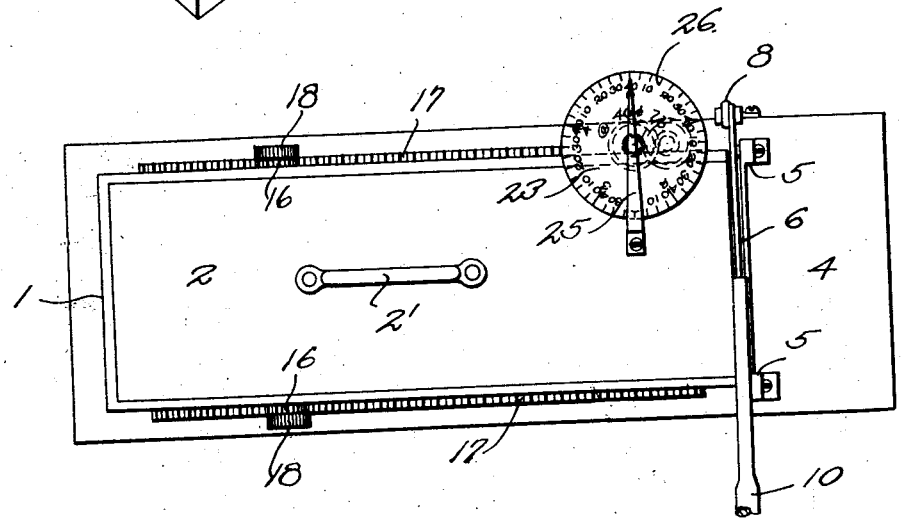
James J. Thacker
Arthur W. Teasley INVENTORS
BY Victor J. Evans
ATTORNEY
WITNESS:

May 22, 1928.  1,670,996
J. J. THACKER ET AL
LOAF CHEESE KNIFE
Filed April 22, 1927   2 Sheets-Sheet 2
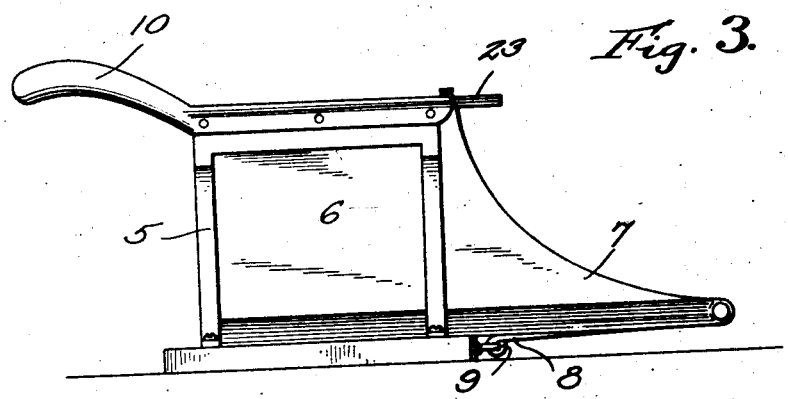
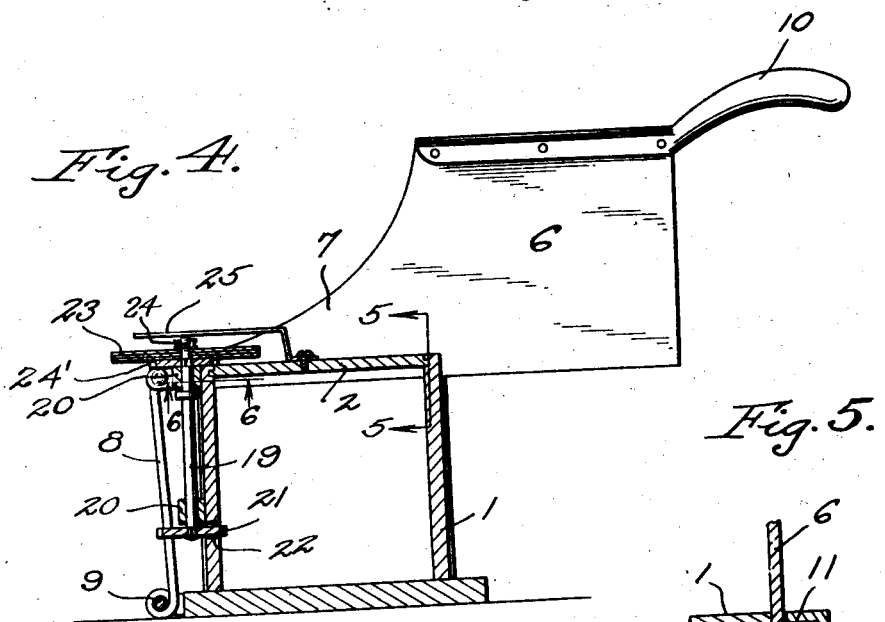
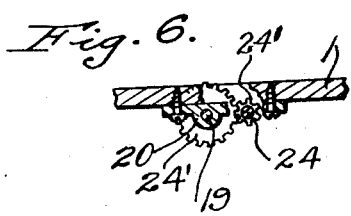
James J. Thacker
Arthur W. Teasley
INVENTORS Patented May 22, 1928.

1,670,996

UNITED STATES PATENT OFFICE.

JAMES JOEL THACKER AND ARTHUR WESLEY TEASLEY, OF LEBANON, TENNESSEE.

LOAF-CHEESE KNIFE.

Application filed April 22, 1927. Serial No. 185,885.

This invention relates to a vending device for loaf cheese and the like, the general object of the invention being to provide a container for the loaf having a knife at one end thereof with manually operated means for moving the loaf under the knife so that portions of the loaf can be sliced therefrom by the knife.

Another object of the invention is to provide means for computing the cost of the sliced portion, with means for operating the same by the movement of the loaf.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like of corresponding parts throughout the several views, and in which:—

Figure 1 is a perspective view of the device with the top removed.

Figure 2 is a plan view with the top in position.

Figure 3 is a front end view.

Figure 4 is a transverse sectional view with the knife in raised position.

Figure 5 is a section on line 5—5 of Figure 4.

Figure 6 is a section on line 6—6 of Figure 4.

In these views, 1 indicates a box or casing which is to contain the loaf of cheese or other article to be vended, this box having its front open and a cover 2 closes its top, this cover sliding in grooves 3 formed in the upper edges of the box. The base of the box is extended at the front, as shown at 4. A frame 5 is fastened to the base and is spaced slightly from the front ends of the sides of the box, these spaces acting as guideways for the knife 6 which has its rear end extended, as at 7, and this rear end is pivoted to an arm 8 which is pivoted at 9 to an edge of the box. A handle 10 is fastened to the upper edge of the knife. Thus as the knife is pushed rearwardly, the arm will cause it to move downwardly so that a draw cut is secured.

A spring plunger 11 is carried by the upper part of the frame 5 and tends to hold the knife in raised position, as shown in Figure 5. A follower 12 is arranged in the box and has a shaft 13 fastened thereto by the clips 14. The ends of this shaft pass through longitudinally arranged slots 15 formed in the sides of the box and toothed wheels 16 are fastened to said ends and engage rack bars 17 fastened to the exterior sides of the box adjacent the slots 15. A knob 18 is secured to one end of the shaft so that the same can be rotated by the fingers, and as will be seen, when this shaft is so rotated, the toothed wheels, engaging the racks, will cause the shaft and the follower to move lengthwise in the box.

A vertically arranged shaft 19 is rotatably mounted in brackets 20 which are carried by one side of the box adjacent the front thereof and a toothed disk 21 is fastened to the lower end of the shaft and extends into the box through a slot 22 formed therein so that this wheel will be engaged by the loaf and thus the shaft will be rotated by the movement of the loaf.

A plurality of dial forming disks 23 are removably secured to the top end of a stub shaft 24 journaled at the side of the box and which is geared to the shaft 19 by the gears 24' and these disks are arranged above the top of the casing and overlap the same. A pointer 25 is fastened to the cover 2 and extends over the top disk. The disks are provided with the graduations 26 and each disk has its graduations arranged to compute the prices of the slices cut from the loaf at a certain cost per pound, the cost per pound differing on the different disks. For instance, the top disk shown in Figure 2 is used with a five pound loaf which is to be sold at the rate of forty cents a pound, and the graduations on this disk are so arranged that the loaf can be cut into five cent slices, ten cent slices, etc. The next disk would have its graduations arranged to indicate the price at thirty-five cents a pound and the third disk would be used when the loaf is selling at forty-five cents a pound. Thus it is simply necessary to place the proper disk uppermost when the price of the loaf changes.

As will be seen, with this device, the cheese can be moved under the knife by turning the knob 18 and the extent of movement, according to the price to be paid for the slice, is ascertained from the dial and pointer. After the loaf has been moved to the proper extent, the handle of the knife is pressed upon, which will cause it to move downwardly with a shearing cut and the slices will drop upon the extension 4 of the base.

We prefer to make the box longer than the loaf of cheese so that when but a small part of the loaf in the box remains, a new loaf is placed therein in rear of the remains of the first loaf so that this new loaf will push the balance of the first loaf under the knife.

The cover 2 is provided with a handle 2' so that the box can be carried to and from the ice box in which the cheese is to be kept.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. A device of the class described comprising a casing adapted to hold the article to be vended and having its front open, a follower in the casing for moving the article toward the front, a cutting member at the front for slicing the article and means actuated by the movement of the article in the casing for computing the price of the slice cut from the article.

2. A vending machine comprising a box having its front open with its base extended at the front, a knife slidably arranged at the front of the box, the sides of the box having longitudinally extending slots therein, a shaft passing through the slots, a follower within the box fastened to the shaft, toothed members on the ends of the shaft, rack bars adjacent the slots with which the members engage, a vertically arranged shaft adjacent the front end of the box, a toothed disk thereon adapted to engage an article in the box so that the shaft will be rotated by the movement of said article, a stub shaft journaled on the box and geared to the vertically arranged shaft, a price indicating dial detachably connected with the upper end of the stub shaft and a pointer on the box extending over the dial.

In testimony whereof we affix our signatures.

JAMES JOEL THACKER.
ARTHUR WESLEY TEASLEY.